US006889684B2

United States Patent
McAulay et al.

(10) Patent No.: US 6,889,684 B2
(45) Date of Patent: May 10, 2005

(54) APPARATUS, SYSTEM AND METHOD FOR CUTTING A CRYSTAL INGOT

(75) Inventors: Shawn V. McAulay, Vancouver, WA (US); Kazuhisa Takamizawa, Vancouver, WA (US)

(73) Assignee: SEH America, Inc., Vancouver, WA (US)

( * ) Notice: Subject to any disclaimer, the term of this patent is extended or adjusted under 35 U.S.C. 154(b) by 97 days.

(21) Appl. No.: 10/289,003

(22) Filed: Nov. 6, 2002

(65) Prior Publication Data

US 2004/0084042 A1 May 6, 2004

(51) Int. Cl.[7] .................................................. B28D 1/06
(52) U.S. Cl. ....................................... 125/21; 125/16.02
(58) Field of Search ............................... 125/21, 16.02, 125/16.01; 83/651.1

(56) References Cited

U.S. PATENT DOCUMENTS

| | | | | |
|---|---|---|---|---|
| 5,269,285 A | * | 12/1993 | Toyama et al. | 125/16.01 |
| 5,778,869 A | * | 7/1998 | Toyama | 125/16.02 |
| 5,829,424 A | | 11/1998 | Hauser | |
| 5,937,844 A | * | 8/1999 | Kiuchi et al. | 125/16.02 |
| 5,944,007 A | | 8/1999 | Miyoshi et al. | |
| 6,065,461 A | * | 5/2000 | Asakawa et al. | 125/16.02 |
| 6,067,976 A | | 5/2000 | Katayama et al. | |
| 6,381,830 B1 | * | 5/2002 | Chikuba et al. | 29/557 |
| 6,443,143 B1 | * | 9/2002 | Ishida et al. | 125/16.02 |

OTHER PUBLICATIONS

C.P. Chen; *Multi–Wire Slurry Wafering Demonstrations;* Feb. 22, 1978; 95 pages; JPL Pub. 78–37; Jet Propulsion Laboratory, California Institute of Technology; Pasadena, California.

* cited by examiner

*Primary Examiner*—Lee D. Wilson
(74) *Attorney, Agent, or Firm*—Alston & Bird LLP

(57) ABSTRACT

The apparatus, system and method for cutting crystal ingot provide techniques for cutting an ingot into wafers with a wire cutting apparatus utilizing wire with a diameter of less than 0.18 mm, such as 0.14 mm. The wire cutting apparatus also includes multiple rollers about which the wire is wrapped, and nozzles for applying slurry to the wire. One of the rollers is located on one side of the crystal ingot, while another roller is located on the other side of the crystal ingot. At least one nozzle is disposed proximate the first and second rollers. The nozzles collectively disperse slurry at a rate in the range of 40 to 60 liters per minute, such as 50 liters per minute, and at a viscosity of 42 to 62 centipose, such as 52 centipose.

25 Claims, 2 Drawing Sheets

APPARATUS, SYSTEM AND METHOD FOR CUTTING A CRYSTAL INGOT

BACKGROUND OF THE INVENTION

Figure 1:
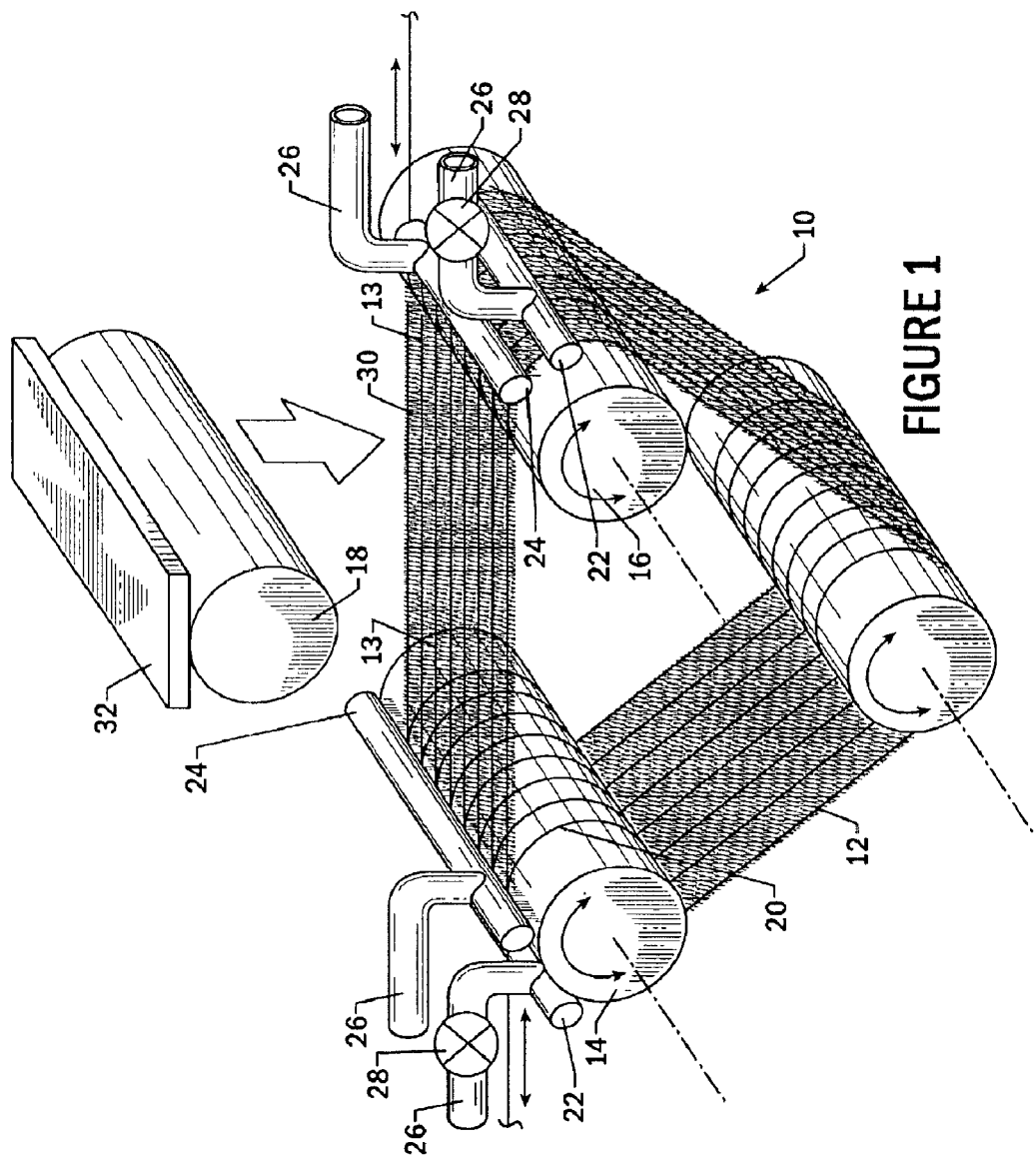

The present invention relates to a technique for cutting a crystal ingot with wire cutting apparatus, and in particular to such a technique utilizing wire with a diameter smaller than 0.18 mm, such that less of the crystal ingot is wasted as the wire cuts through the crystal ingot.

In various industries, particularly the electronic industry, thin wafers of material are utilized in the fabrication of the components. The wafers are typically sliced from a larger body of the material known as a crystal ingot. For instance, large bodies of polycrystalline or monocrystalline silica, GaAs, InP, GGG (gadolinium-gallium garnet), quartz, synthetic sapphire, and/or ceramic materials may be sliced into wafers, which are used to fabricate various components.

As a specific example, the semiconductor industry typically manufactures semiconductor substrates that are used to fabricate integrated circuits from single crystal ingots. These ingots are commonly grown by a standard melt crystal growth technique, such as the Czochralski (CZ) method. In the CZ method, a generally cylindrical single crystal is pulled vertically from a silicon melt in a heated crucible. The growth is initiated by dipping a small seed crystal in the melt, and after the thermal equilibrium is reached, the crystal is pulled upward so that it grows with a relatively constant diameter. At the same time, the crystal ingot and the crucible are rotated in opposite directions. This process results in a single crystal ingot that has a generally constant radius, uniform dopant and impurity distribution, low number of defects, and continuous CZ growth.

Once the single crystal ingot is formed, further processing is necessary to shape the cylindrical structure so as to have a prescribed diameter. This processing typically involves centering the single ingot crystal in a shaping device, such as a lathe, and then grinding the ingot to the prescribed diameter dimension. Once the ingot has been properly ground to the required diameter, the ingot is then sliced perpendicular to the longitudinal axis to obtain generally planar wafers. The resulting wafers are then further processed by lapping, etching, and polishing both the major surface(s) and the edge, prior to forming integrated circuits or other semiconductor devices thereupon.

An ingot is typically sliced into wafers with a wire cutting apparatus. A wire cutting apparatus includes a thin wire arranged to have a number of parallel wire segments. By advancing the wire in a reciprocating fashion, and pushing the ingot through the parallel wire segments, the ingot is cut into wafers. The spacing of the wires correlates to the desired thickness of the resulting wafers. The wires are usually disposed on cylindrical rollers, which define grooves to receive the wire. The rollers are spaced apart to create the parallel wire segments through which the ingot is advanced.

In order to advance the wire, at least one of the rollers is typically rotationally driven. In one conventional embodiment of the wire cutting apparatus, three rollers are arranged in a substantially triangular configuration, such as the wire cutting apparatus commercially available from Nippei Toyama Company of Tokyo, Japan. In another conventional embodiment of the wire cutting apparatus, four rollers are arranged in a substantially rectangular configuration, such as the wire cutting apparatus commercially available from HCT Shaping Systems SA of Cheseaux, Switzerland.

To facilitate cutting the crystal ingot with the wires, a slurry is applied to the wire prior to the wire engaging the crystal ingot. The slurry is typically a mixture of an abrasive material and a coolant. When multiple wire segments span across the rollers to cut the crystal ingot into multiple wafers, the slurry is applied to the wire segments and generally forms a relatively continuous sheet between the wire portions. As such, the wire carries at least some of the abrasive as it passes through the crystal ingot. The sheet of slurry must be uniform across the wire segments for the wire to slice the crystal ingot uniformly. When the sheet of slurry is not applied uniformly, the wires cut the ingot differently, thereby producing wafers that disadvantageously exhibit warp. Warp is generally defined as the maximum deviation of a wafer from a best fit plane through the wafer. Although a small amount of warp in wafers may be acceptable for some applications, excessive warp generally renders a wafer unusable. Thus, it is desirable to minimize warp in a wafer by ensuring that the slurry is evenly distributed on and carried by the wire segments.

The slurry typically is applied to the wire segments via nozzles that spray the slurry toward the wire. The nozzles may be any shape or type of dispenser capable of spraying the desired amount and desired type of slurry onto the wire. For example, a nozzle may be a bar or a rod that extends across the wire segments and defines openings through which the slurry sprays. As such, the nozzle is oriented relative to the wire segments so that the slurry sprays onto the wire segments. For most wire cutting apparatus, particularly wire cutting apparatus with three rollers, two nozzles are positioned on each side of the location where the crystal ingot advances through the wire segments. Thus, two nozzles may be positioned proximate to each roller located on each side of the crystal ingot. The nozzles typically collectively disperse the slurry at a rate of 80 liters/minute. The viscosity of the slurry is typically 71 centipose, and the temperature of the slurry is generally between 26 and 28 degrees Celsius.

The wire utilized to slice crystal ingots typically has a diameter of 0.18 mm or more. As the wire cuts into the crystal ingot, however, a portion of the crystal ingot is destroyed by the wire, which is known as kerf loss. For example, a wire with a 0.18 mm diameter creates a slit having a width of at least 0.18 mm between adjacent wafers as the wires move through the crystal ingot. Since many wafers are cut from a single ingot, the cumulative kerf loss can quickly become significant.

Therefore, there is a desire in the industry for a technique for cutting crystal ingots with wire having a smaller diameter so as to decrease the kerf loss during the cutting process without requiring significant and/or expensive changes to existing wire cutting apparatus. Further, the technique should produce wafers that exhibit minimal, if any, warp or other type of undesirable properties. Unfortunately, some attempts to utilize wire having a diameter less than 0.18 mm have resulted in wafers having unacceptably large warp.

BRIEF SUMMARY OF THE INVENTION

The apparatus, system and method for cutting a crystal ingot of the present invention provide a technique for cutting a crystal ingot into a plurality of wafers that decreases the kerf loss by cutting the ingot with a smaller diameter wire, while maintaining or improving the wafer quality, such as by minimizing the warp in the wafers. In addition, the technique of the present invention can be implemented on existing wire cutting apparatus, such that it is not necessary to incur significant capital costs in order to utilize the present invention. Thus, the apparatus, system and method of the present invention are easy and affordable to implement, in addition to providing cost savings because less of a crystal ingot is wasted in the cutting process.

The apparatus for cutting a crystal ingot according to the present invention includes wire with a diameter of less than 0.18 mm, such as 0.14 mm, for cutting the crystal ingot into multiple wafers. The apparatus also includes multiple rollers about which the wire is wrapped, and first and second nozzles for applying slurry to the wire. A first roller is located on one side of the crystal ingot, while a second roller is located on the other side of the crystal ingot. The first and second nozzles are disposed proximate the first and second rollers, respectively. Advantageously, the nozzles collectively disperse slurry at a rate in the range of 40 to 60 liters per minute, such as 50 liters per minute, and at a viscosity of 42 to 62 centipose, such as 52 centipose.

In various embodiments of the apparatus of the present invention, the slurry may be a mixture of a coolant, such as polyethylene glycol, and an abrasive material, such as silicon carbide. The rollers may be rotatably driven, and the wire may travel about the rollers through groves defined in the rollers. In addition, the wire may be made of steel and coated with brass.

In embodiments of the present invention, such as in instances in which an existing wire cutting apparatus is being retrofitted in accordance with the present invention, the system may include a pair of nozzles disposed proximate the first roller and another pair of nozzles disposed proximate the second roller. Each pair of nozzles may be arranged such that a first nozzle of each pair of nozzles is further away from the crystal ingot than a second nozzle. In addition, the system of this embodiment of the present invention includes a restriction element, such as a valve, for at least reducing the slurry dispensed by the first nozzle relative to the second nozzle of each pair of nozzles. The restriction element may prevent the slurry from being dispensed by the first nozzle of each pair of nozzles. Embodiments of the system of the present invention also may include a control element for adjusting the flow rate and/or temperature of the slurry from the second nozzle of each pair of nozzles.

In the method for cutting a crystal ingot of the present invention, the first nozzle of each pair of nozzles on opposite sides of the ingot is deactivated, and the wire about the plurality of rollers is advanced. Concurrent with the advancement of the wire, slurry is applied to the wire via the second nozzle of each pair of nozzles, typically in a continuous manner, then the ingot is advanced toward and at least partially through the wire to cut the ingot with the wire.

To advance the wire about the rollers, at least one of the rollers may be rotated, and the wire may be disposed in grooves defined by the rollers. Embodiments of the method of the present invention may also include deactivating the first nozzle by deactivating the nozzle that is further from the ingot than the other nozzle of each pair of nozzles. Furthermore, the method of the present invention may include adjusting the flow rate and/or the temperature of the slurry prior to applying the slurry to the wire.

Thus, the apparatus, system and method of the present invention provide improved techniques for cutting a crystal ingot with wires that are smaller than 0.18 mm. The present invention may be implemented by retrofitting existing wire cutting apparatus by changing the diameter of the wire, the configuration of the nozzle(s) from which the slurry is dispersed, and the rate, viscosity and temperature at which the slurry is dispersed. The configuration of the nozzle(s) and the parameters utilized for the flow rate, viscosity, and temperature of the dispersed slurry permit wafers of equal or improved quality, such as wafers that exhibit minimal warp, to be cut from the ingot. In addition, because the smaller wire creates less kerf loss when cutting the ingot, the apparatus, system and method for cutting an ingot are less costly and more efficient than conventional cutting techniques.

BRIEF DESCRIPTION OF THE SEVERAL VIEWS OF THE DRAWING(S)

Figure 2:
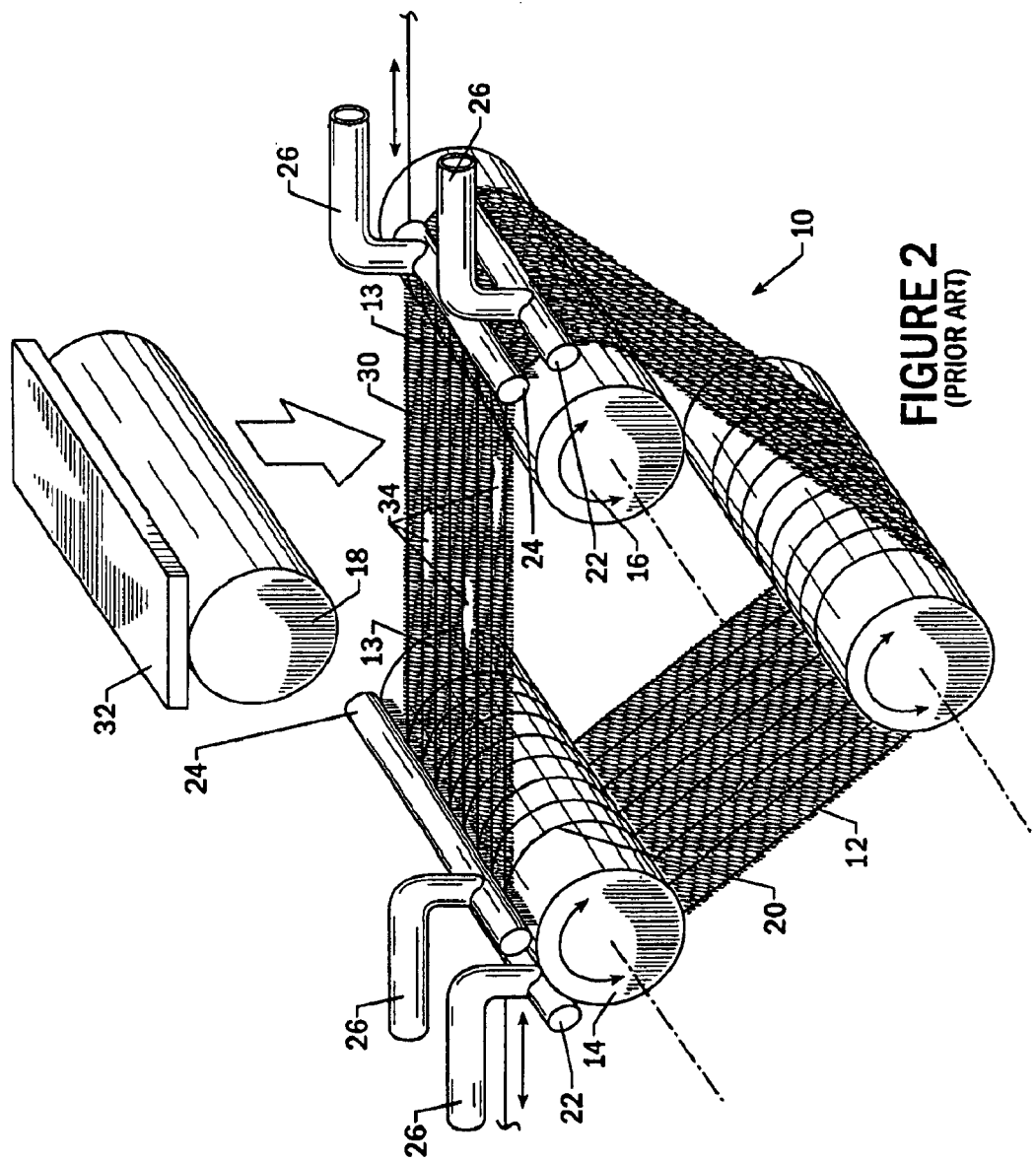

Having thus described the invention in general terms, reference will now be made to the accompanying drawings, which are not necessarily drawn to scale, and wherein:

FIG. 1 illustrates a three roller wire cutting apparatus with first and second rollers disposed on opposite sides of the crystal ingot, and a pair of first and second nozzles proximate the first and second rollers, in which the first nozzle of each pair of nozzles is deactivated, according to one embodiment of the present invention; and FIG. 2 illustrates a prior art embodiment of a three roller wire cutting apparatus in which both the first and second nozzles of each pair of nozzles disperse slurry on the wires, and the sheet of slurry carried by the wires extending between the pairs of nozzles exhibits a discontinuity.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The apparatus, system and method for cutting a crystal ingot of the present invention provide a technique for cutting crystal ingot into a plurality of wafers that decreases the kerf loss by cutting the ingot with a smaller diameter wire, while maintaining or improving the wafer quality, such as by minimizing the warp in the wafers. In addition, the technique of the present invention can be implemented on existing wire cutting apparatus, such that it is not necessary to incur significant capital costs in order to utilize the present invention. Thus, the apparatus, system and method of the present invention are easy and affordable to implement, in addition to providing cost savings because less of a crystal ingot is wasted in the cutting process.

FIG. 1 illustrates one embodiment of the wire cutting apparatus 10 of the present invention. The wire cutting apparatus 10 includes wire 12 that has a diameter of less than 0.18 mm. In a preferred embodiment of the wire cutting apparatus 10, the wire 12 has a diameter of 0.14 mm. Thus, the wire 12 is smaller in diameter than the 0.18 mm wire typically utilized in conventional wire cutting apparatus. The wire 12 may be made of steel, and may be coated with brass, but in other embodiments of the wire cutting apparatus 10, the wire may be made of other materials, so long as the resulting wire is capable of cutting through a crystal ingot.

The wire cutting apparatus 10 shown in FIG. 1 illustrates a three roller wire cutting apparatus configuration. The three rollers, however, may be arranged in other manners, or a different number of rollers may be used in other embodiments of the wire cutting apparatus. Regardless of the roller configuration, two of the rollers should be spaced apart enough that the crystal ingot may at least partially move between the two rollers. For example, as shown in FIG. 1, the first roller 14 and the second roller 16 are disposed on opposite sides of the crystal ingot 18.

The rollers typically define circumferential grooves 20 through which the wire 12 may travel. As such, the grooves 20 may be defined in the rollers to provide the desired arrangement of the wire segments 13 between the rollers. As shown in FIG. 1, the grooves, and therefore the wire, may be arranged parallel to one another as the wire extends between the first and second rollers. In addition, the spacing between the grooves 20, and therefore the wire segments 13, is chosen based upon the desired thickness of the resulting wafers. When the crystal ingot 18 is moved at least partially through the wire segments 13, then the ingot may be cut into wafers having a uniform thickness.

To facilitate moving the crystal ingot 18 through the wire segments 13, the crystal ingot 18 may be attached to a mounting beam 32. In one embodiment of the cutting apparatus, the mounting beam 32 is formed in the shape of a rectangular solid, as shown in FIG. 1, but in other embodiments, the mounting beam 32 may be other shapes. The mounting beam 32 is typically formed of a resin material, but may be formed of graphite or other materials. The mounting beam 32 may be attached to the crystal ingot 18 in any manner known to those skilled in the art. For instance, in one embodiment, the mounting beam 32 is attached to the crystal ingot 18 with a water-soluble adhesive epoxy, such as product number AD1238/AD3848 commercially available from Valtech Corporation of Pottstown, Pa. As the wire is moved back and forth over the rollers, the crystal ingot 18, therefore, moves through the wire 12 to cut the ingot into wafers. To ensure that the wire segments 13 completely cut through the ingot, the wire may exit the ingot and partially cut into the mounting beam 32, while the wafers continue to be attached to the mounting beam 32. The combination of the mounting beam and the wafers then may be removed from the wire cutting apparatus 10, and the wafers may be removed from the mounting beam 32, such as by wetting the water-soluble adhesive.

The wire 12 may travel about the rollers in any manner known to those skilled in the art. In one embodiment of the wire cutting apparatus of the present invention, at least one of the rollers may be rotatably driven, such as via a motor. The rotating roller, in turn, drives the movement of the wire about all of the rollers. In this embodiment, the wire may be continuous so as to extend about the rollers. In other embodiments of the wire cutting apparatus of the present invention, the wire 12 may be pulled via device(s) downstream from at least one of the first and second rollers. For instance, one device may be attached to one end of the wire, while another device may be attached to the other end of the wire, such that the devices may cooperate to altenately move the wire back and forth.

The wire cutting apparatus 10 also includes nozzles for dispensing slurry onto the wire 12. Typically, as shown in FIG. 1, a pair of nozzles is disposed proximate each of the first and second rollers, 14, 16. Each pair of nozzles includes a first nozzle 22 and a second nozzle 24. In other embodiments of the wire cutting apparatus of the present invention, only a single nozzle may be disposed proximate each of the first and second rollers, 14, 16. For instance, a first nozzle may be disposed proximate the first roller 14, and a second nozzle may be disposed proximate the second roller 16.

The nozzles 22, 24 are generally shaped such that each is capable of extending over all of the wire segments. In addition, the nozzles define openings through which the slurry is dispersed. Thus, the nozzles are positioned over the wire such that the openings are directed toward the wire. The slurry is transported from a supply to the nozzles via at least one supply conduit 26 that connects to the nozzles. Although the supply conduits 26 shown in the embodiment of FIG. 1 are connected to the nozzles near a middle portion of the nozzles 22, 24, the supply conduits 26 may be connected to the nozzles at any other point on the nozzles, such as at or near one or both ends of the nozzles. One or more of the supply conduits 26 may also include a restriction element 28 to control the flow the slurry to the respective nozzle(s). Alternatively, the restriction element 28 may be incorporated within the respective nozzle(s) if desired. Regardless of its location, the restriction element 28 may partially or completely cut off the flow of slurry to one or more nozzle, as will be explained in detail hereinbelow.

The slurry that is applied to the wire 12 by the nozzles facilitates cutting the crystal ingot 18. In addition, the slurry serves to cool the ingot 18, the wire 12 and the rollers As such, the slurry may be made of a coolant and abrasive material mixture. The coolant also provides a lubricant for the wire and the abrasive material as the wire carries the abrasive material through the ingot. The abrasive material is carried by the wire and actually cuts through the ingot. For instance, the abrasive may have JIS 1000 grain size. However, the abrasive may have other grain sizes, if so desired. In addition, although the slurry may be formed of various ratios of coolant and abrasive particles, the coolant and abrasive material may be mixed in a one-to-one ratio. In one embodiment of the wire cutting apparatus, the coolant may be polyethylene glycol and/or the abrasive material may be silicon carbide. However, other coolants and/or the abrasive materials may be utilized.

In applying the slurry, the wire segments 13 advantageously support a relatively continuous sheet of slurry 30 between the first and second rollers 14, 16. If the sheet of slurry carried by the wire segments is not continuous, then some wire segments may carry more abrasive material than other wire segments and therefore may cut through the crystal ingot at a different rate. When the wire segments do not move through the ingot at the same rate, then the resulting wafers typically exhibit warp.

FIG. 2 illustrates an unexpected problem that was experienced when a 0.14 mm wire was utilized in a conventional wire cutting apparatus. As described above, the conventional wire cutting apparatus includes two nozzles 22, 24 positioned proximate to each roller 14, 16, located on each side of the location where the crystal ingot advances through the wire segments. For this embodiment, each pair of nozzles collectively dispense the slurry at a rate of 80 liters/minute. The viscosity of the slurry is typically 71 centipose, and the temperature of the slurry is generally between 26 and 28 degrees Celsius.

It was discovered that the conditions described above cause discontinuities in the slurry carried by the wire segments 13. Although not wishing to be bound by theory, it is believed that the discontinuity was created by slurry splashing onto the sheet of slurry otherwise supported by the wire segments. As shown in FIG. 2, discontinuities 34 in the slurry carried by the wire segments 13 means that the wire segments proximate the discontinuity carry fewer abrasive particles, than the other wire segments. As such, when the crystal ingot 18 is moved through the wire segments 13 of FIG. 2, the wire segments do not cut the ingot evenly, and the resulting wafers may exhibit warp and/or other undesirable features, such as wafers that are thicker near at least a portion of the edge of the wafer than near the middle of the wafer.

FIG. 1, therefore, illustrates one embodiment of the wire cutting apparatus 10 of the present invention that remedies the situation described above. While the wire cutting apparatus 10 of the present invention need only include a single nozzle proximate each of the first and second rollers 14, 16, FIG. 1 is also an illustration of the wire cutting system of one embodiment of the present invention which effectively retrofits a conventional wire cutting apparatus having a pair of nozzles proximate each of the first and second rollers to overcome the problems described in conjunction with FIG. 2 and which permits smaller wire, such as wire having a diameter of less than 0.18 mm to be utilized while still allowing the wire segments to support a continuous sheet of slurry, thereby permitting consistent cutting of the wafers. As such, the wire cutting apparatus of FIG. 1 may include a restriction element 28. The restriction element 28 is utilized to limit the flow of slurry to at least one of each pair of nozzles from the supply conduit 26. The restriction element 28 may be any type of element that is capable of limiting the amount of slurry that is dispersed by a nozzle. For example, the restriction element 28 may be a switch that turns the slurry completely on or off. In other embodiments of the wire cutting apparatus 10 of the present invention, the restriction element 28 may be a valve that is capable of controlling the amount of slurry that flows from the supply conduit 26 to a respective nozzle. Thus, the valve may not completely stop the flow of slurry, but instead, may reduce the flow.

In the embodiment of the wire cutting apparatus 10 shown in FIG. 1, the restriction element 28 has completely stopped the flow of slurry to the first nozzle 22 of each pair of nozzles. Thus, slurry only flows out of the second nozzle 24 of each pair of nozzles. In other embodiments of the wire cutting apparatus of the present invention, a restriction element may partially or totally limit the flow of slurry from the second nozzle 24 of each pair of nozzles, while permitting the slurry to continue flowing from the first nozzle 22 of each pair of nozzles. In further embodiments of the wire cutting apparatus of the present invention, one of the nozzles of each pair of nozzles may be removed, such that only one nozzle dispenses the slurry proximate each of the first and second rollers 14, 16. Partially or totally limiting the slurry dispensed from one nozzle of each pair of nozzles may be accomplished by a variety of other techniques known to those skilled in the art, such as by removing or disconnecting the supply conduit(s) 26 that supply slurry to the respective unneeded nozzle(s).

In addition, in one advantageous embodiment of the wire cutting apparatus 10 of the present invention, the nozzles collectively disperse the slurry at a rate in the range of 40 to 60 liters per minute, and at a viscosity of 42 to 62 centipose. For example, in a specific embodiment, the nozzles collectively disperse the slurry at a rate of 50 liters per minute, and at a viscosity of 52 centipose. Furthermore, the temperature of the slurry is preferably between 24 and 29° C. In embodiments of the wire cutting system of the present invention, a control element, such as a processor, may provide the capability for adjusting the flow rate and temperature of the slurry as described above.

In a preferred embodiment of a three roller configuration of a wire cutting apparatus, the temperature of the slurry may be 27.5° C. when the ingot 18 begins to move through the wire segments 13, then the temperature of the slurry may decrease to 26° C. for the rest of the cut. This embodiment may further decrease the warp of the resulting wafers cut by a three roller wire cutting apparatus according to the present invention. To control the temperature of the slurry, such as to decrease the temperature of the slurry during the cutting of the ingot, the slurry may be routed through a heat exchanger. For instance, a heat exchanger may be located upstream of or within the supply conduit through which the slurry flows to the nozzle(s). Alternatively, in an embodiment of a wire cutting apparatus having four rollers about which the wire 12 travels, the temperature of the slurry is preferably maintained at 25° C. throughout the cutting process, in order to minimize the amount of warp exhibited by the resulting wafers.

Thus, the wire cutting apparatus and system of the present invention provide techniques for cutting a crystal ingot with wires that are smaller than 0.18 mm. The present invention may be implemented by retrofitting existing wire cutting apparatus by changing the diameter of the wire, the configuration of the nozzle(s) from which the slurry is dispersed, and the rate, viscosity and temperature at which the slurry is dispersed. The configuration of the nozzle(s) and the parameters utilized for the flow rate, viscosity, and temperature of the dispersed slurry permit wafers of equal or improved quality, such as wafers that exhibit minimal warp, to be cut from the ingot. In addition, because the smaller wire creates less kerf loss when cutting the ingot, the apparatus and system for cutting an ingot are less costly and more efficient than conventional cutting techniques.

The present invention also includes a method for cutting a crystal ingot with a wire cutting apparatus. A wire cutting apparatus with wire having a diameter less than 0.18 mm and a pair of nozzles associated with each of the first and second rollers, as described by the embodiments detailed above, is utilized to carry out the method. Initially, one nozzle of each pair of nozzles is deactivated. Preferably, the first nozzle 22 of each pair of nozzles, i.e., the nozzle further away from the ingot, is deactivated, such as via the restriction element 28 as described above, but in other embodiments, the second nozzle 24 of each pair of nozzles may be deactivated. The wire 12 may then be advanced about the rollers, and the slurry may be applied to the wire segments 13 concurrent with the advancement of the wire. The slurry is therefore applied with the nozzle of each pair that is activated. The flow rate, viscosity and/or the temperature of the slurry applied to the wire segments may be adjusted as described above, to permit the slurry to be applied without interruption, such that there are no discontinuities in the sheet of slurry. Finally, the crystal ingot is moved toward and at least partially through the wire segments to cut the crystal ingot into wafers with the wire. The resulting wafers therefore exhibit minimal warp and/or other undesirable features.

The apparatus, system and method of the present invention provide techniques for configuring a wire cutting apparatus such that the apparatus may utilize wire that has a smaller diameter than that typically utilized in conventional wire cutting apparatus, in order to decrease the amount of kerf loss experienced when cutting a crystal ingot into wafers. The techniques provided by the present invention are also capable of producing high-quality wafers that exhibit minimal warp and/or other undesirable features. Thus, the apparatus, system and method of the present invention advantageously decrease the costs associated with producing wafers from crystal ingot.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodi- That which is claimed:

1. An apparatus for cutting a crystal ingot, wherein the apparatus comprises:
   wire for cutting the crystal ingot into a plurality of wafers, wherein said wire has a diameter less than 0.18 mm;
   a plurality of rollers about which said wire is wrapped, wherein said plurality of rollers include first and second rollers disposed on opposite sides of the crystal ingot; and
   first and second nozzles disposed proximate said first and second rollers, respectively, for applying a slurry to said wire to facilitate cutting the crystal ingot, wherein said nozzles collectively disperse the slurry at a rate in a range of 40 to 60 liters per minute, and at a viscosity of 42 to 62 centipose.

2. The apparatus for cutting a crystal ingot according to claim 1, wherein at least one of said plurality of rollers is rotatably driven, and wherein each roller defines at least one circumferential groove, through which said wire travels as at least one of said plurality of rollers is rotatably driven.

3. The apparatus for cutting a crystal ingot according to claim 1, wherein said wire has a diameter of 0.14 mm.

4. The apparatus for cutting a crystal ingot according to claim 1, wherein said wire is made of steel and coated with brass.

5. The apparatus for cutting a crystal ingot according to claim 1, wherein said first and second nozzles collectively apply slurry at a rate of 50 liters per minute.

6. The apparatus for cutting a crystal ingot according to claim 1, wherein said first and second nozzles collectively apply slurry having a viscosity of 52 centipose.

7. The apparatus for cutting a crystal ingot according to claim 1, wherein said first and second nozzles apply slurry comprising a coolant and an abrasive material.

8. The apparatus for cutting a crystal ingot according to claim 7, wherein the coolant comprises polyethylene glycol.

9. The apparatus for cutting a crystal ingot according to claim 7, wherein the abrasive material comprises silicon carbide.

10. A system for cutting a crystal ingot, wherein said system comprises:
    a wire capable of cutting through the crystal ingot;
    a plurality of rollers about which said wire is wrapped, wherein said plurality of rollers include first and second rollers disposed on opposite sides of the crystal ingot;
    a plurality of nozzles capable of applying a slurry to said wire, wherein said plurality of nozzles comprise one pair of nozzles disposed proximate the first roller and another pair of nozzles disposed proximate the second roller; and
    a restriction element for at least reducing the slurry dispensed by a first nozzle of each pair of nozzles relative to a second nozzle of each pair of nozzles.

11. The system for cutting a crystal ingot according to claim 10, wherein at least one of said plurality of rollers is capable of being rotationally driven, and wherein said wire is capable of traveling about said plurality of rollers.

12. The system for cutting a crystal ingot according to claim 10, further comprising a control element capable of adjusting a flow rate of the slurry from the second nozzle of each pair of nozzles.

13. The system for cutting a crystal ingot according to claim 12, wherein said control element is also capable of adjusting a temperature of the slurry dispensed by the second nozzle of each pair of nozzles.

14. The system for cutting a crystal ingot according to claim 10, wherein each pair of nozzles are arranged such that the first nozzle is further from the crystal ingot than the second nozzle.

15. The system for cutting a crystal ingot according to claim 10, wherein said restriction element is capable of preventing the slurry from being dispensed by the first nozzle.

16. The system for cutting a crystal ingot according to claim 10, wherein said restriction element is a valve for controlling the slurry dispensed by the first nozzle.

17. The system for cutting a crystal ingot according to claim 10, wherein said wire has a diameter less than 0.18 mm.

18. The system for cutting a crystal ingot according to claim 10, wherein said plurality of nozzles collectively dispense the slurry at a rate in a range of 40 to 60 liters per minute, and at a viscosity of 42 to 62 centipose.

19. A method for cutting a crystal ingot with a wire cutting apparatus comprising a plurality of rollers, including first and second rollers on opposite sides of the crystal ingot and a pair of nozzles associated with each of the first and second rollers, the method comprising:
    deactivating a first nozzle of each pair of nozzles;
    advancing a wire about the plurality of rollers;
    applying a slurry to the wire via a second nozzle of each pair of nozzles concurrent with advancement of the wire; and
    moving the crystal ingot toward and at least partially through the wire to cut the crystal ingot with the wire.

20. The method for cutting a crystal ingot according to claim 19, wherein advancing the wire about the plurality of rollers comprises rotating at least one of the plurality of rollers such that the wire travels about the plurality of rollers.

21. The method for cutting a crystal ingot according to claim 19, wherein advancing the wire about the plurality of rollers comprises disposing the wire in grooves defined by the rollers.

22. The method for cutting a crystal ingot according to claim 19, wherein applying the slurry to the wire via the second nozzle comprises applying the slurry to the wire without interruption.

23. The method for cutting a crystal ingot according to claim 19, wherein deactivating the first nozzle of the pair of nozzles comprises deactivating the nozzle of each pair of nozzles that is further away from the crystal ingot than the other nozzle.

24. The method for cutting a crystal ingot according to claim 19, further comprising adjusting a flow rate of the slurry from the second nozzle prior to applying the slurry to the wire.

25. The method for cutting a crystal ingot according to claim 19, further comprising adjusting a temperature of the slurry prior to applying the slurry to the wire.

* * * * *